US008630971B2

(12) United States Patent
Nair et al.

(10) Patent No.: US 8,630,971 B2
(45) Date of Patent: Jan. 14, 2014

(54) SYSTEM AND METHOD OF USING MULTI PATTERN VITERBI ALGORITHM FOR JOINT DECODING OF MULTIPLE PATTERNS

(75) Inventors: Nishanth Ulhas Nair, Bangalore (IN); Thippur Venkatanarasaiah Sreenivas, Bangalore (IN)

(73) Assignee: Indian Institute of Science, Bangalore (IN)

( * ) Notice: Subject to any disclaimer, the term of this patent is extended or adjusted under 35 U.S.C. 154(b) by 907 days.

(21) Appl. No.: 12/652,608

(22) Filed: Jan. 5, 2010

(65) Prior Publication Data

US 2011/0125701 A1 May 26, 2011

(30) Foreign Application Priority Data

Nov. 20, 2009 (IN) .......................... 2870/CHE/2009

(51) Int. Cl.
*G06N 5/00* (2006.01)
*G06F 1/00* (2006.01)

(52) U.S. Cl.
USPC .............................. 706/52; 704/266; 709/224

(58) Field of Classification Search
USPC ......................................................... 706/52
See application file for complete search history.

(56) References Cited

U.S. PATENT DOCUMENTS

| 5,590,242 | A | * | 12/1996 | Juang et al. | .................... | 704/245 |
| 2001/0018653 | A1 | * | 8/2001 | Wutte | ........................ | 704/256 |
| 2009/0313025 | A1 | * | 12/2009 | Conkie et al. | .................. | 704/266 |

FOREIGN PATENT DOCUMENTS

CN        1183158 A      5/1998

OTHER PUBLICATIONS

"Viterbi algorithm ," accessed at http://en.wikipedia.org/wiki/Viterbi_algorithm, last modified on Apr. 24, 2012, pp. 16.
Kobayashi, Takao et al., "Noisy speech recognition using HMM-based cepstral parameter generation and compensation," The Journal of the Acoustical Society of America, vol. 100, No. 4, Oct. 1996, 4pSC12, pp. 2790.
Lleida, Eduardo et al., "Utterance Verification in Continuous Speech Recognition: Decoding and Training Procedures," IEEE Transactions on Speech and Audio Processing, vol. 8, No. 2, Mar. 2000, pp. 126-139.

(Continued)

*Primary Examiner* — Kakali Chaki
*Assistant Examiner* — Kalpana Bharadwaj
(74) *Attorney, Agent, or Firm* — Brundidge & Stanger, P.C.

(57) ABSTRACT

Systems, devices, and methods for using Multi-Pattern Viterbi Algorithm for joint decoding of multiple patterns are disclosed. An exemplary method may receive a plurality of sets of time-sequential signal observations for each of a number K of signal repetitions. Further, each set of signal observations is associated with a respective dimension of a K-dimensional time grid having time-indexed points. Moreover, at each of a plurality of the time-indexed points, a state cost metric is calculated with a processor for each state in a set of states of a hidden Markov model (HMM). In addition, each state in the set of states and for a given time-indexed point, the state cost metric calculation provides a most-likely predecessor state and a corresponding most-likely predecessor time-indexed point. The exemplary method may also determine a sequence of states using the calculated state cost metrics and determine a corresponding cumulative probability measure for the HMM.

18 Claims, 8 Drawing Sheets

(56) References Cited

OTHER PUBLICATIONS

Nair, Nishanth Ulhas et al., "Algorithms for Joint Evaluation of Multiple Speech Patterns for Automatic Speech Recognition," Speech Recognition, Technologies and Applications, pp. 119-158, Nov. 2008.

Nair, Nishanth Ulhas et al., "Joint Decoding of Multiple Speech Patterns for Robust Speech Recognition," IEEE Dec. 2007, pp. 93-98.

Wysocki, Tadeusz A. et al., Signal Processing for Telecommunications and Multimedia, Chapters 1-3, Springer Science + Business Media, Inc., 2005.

International Search Report issued by the Australian Patent Office in PCT/IB2010/054050, dated Dec. 8, 2010.

\* cited by examiner

SYSTEM AND METHOD OF USING MULTI PATTERN VITERBI ALGORITHM FOR JOINT DECODING OF MULTIPLE PATTERNS

CROSS-REFERENCE TO RELATED APPLICATION

The present application claims priority under 35 U.S.C. §119(d) to a corresponding patent application filed in India and having application number 2870/CHE/2009, filed on Nov. 20, 2009, the entire contents of which are herein incorporated by reference.

BACKGROUND

In day to day telephone/mobile conversations, a listener in a conversation may often ask a speaker to repeat certain portions of their speech due to the listener's inability to understand the certain portions of speech. Such a situation happens more often in the presence of background noise where the intelligibility of speech is affected significantly. Speech recognition systems, devices, and methods can utilize such repeated information, especially in the presence of heavy/bursty background noise, to better discern speech for various applications.

Some speech recognition systems, such as Automatic Speech Recognition (ASR) systems, work well when test and training conditions are comparable. An example of an ASR system may be the speech recognition system used in an automated call center for an airline. Many speech recognition systems, including ASR systems, store training data that includes data representing the most likely used parts of speech. Training data is unaffected by ambient noise, different speaker accents, or any other negative audio effects on the speech data. However, real world testing environments are different than training conditions. Various factors like additive noise, acoustic echo, and speaker accent may affect speech recognition performance in many real world test environments. Since ASR can be characterized as a statistical pattern recognition problem, if the test patterns are unlike anything used to train the models, then errors may occur. Various approaches to increase robustness in ARS technology have been proposed that include: (i) reducing the variability of the model or (ii) modifying the statistical model parameters to suit the noisy condition. However, under very high noise conditions or bursty error channels, such as in packet communication where packets may be dropped, speech recognition systems may benefit from taking the approach of using repeated utterances to accurately decode speech.

SUMMARY

The present application discloses systems, devices, and methods for using a Multi-Pattern Viterbi Algorithm to detect signals from multiple patterns.

One embodiment of the disclosure may be a method that receives a plurality of sets of time-sequential signal observations for each of a number K of signal repetitions. Further, each set of signal observations is associated with a respective dimension of a K-dimensional time grid having time-indexed points. Moreover, at each of a plurality of the time-indexed points, a state cost metric is calculated with a processor for each state in a set of states of a hidden Markov model (HMM). In addition, for each state in the set of states and for a given time-indexed point, the state cost metric calculation provides a most-likely predecessor state and a corresponding most-likely predecessor time-indexed point. In one embodiment, the method includes determining a cost metric at the final state and the terminal time-indexed point. This may also be referred to as a cumulative probability measure that the observations were generated by the corresponding HMM. Thus, some methods further include determining the cost metrics at the final state at the terminal time-indexed point for each of a plurality of HMMs, and then selecting the smallest cost metric and its corresponding HMM. The corresponding HMM is then used to identify the pattern (which for example may be a word in a speech recognition system). Some methods may also include determining a sequence of states using the calculated state cost metrics as well as determining a corresponding cumulative probability measure for the HMM.

Furthermore, some methods involve repeating calculating the state cost metric for each state in the set of states for the plurality of time-indexed points and determining a most likely sequence and corresponding cumulative probability measure for a plurality of HMMs. Thereafter, the method may identify a most likely HMM based on the corresponding cumulative probability measures, or cost metrics, for the plurality of HMMs. The method may also include for a given one of the plurality of time-indexed points, the state cost metric for each state in the set of states is determined by: calculating a cost metric associated with each possible prior state at each possible predecessor time-indexed point; and, selecting the lowest cost metric for each state.

In some embodiments, for a given possible predecessor state, the state cost metrics are based only on observations associated with dimensions that are incremented when moving from the given predecessor time-index point to the given one of the plurality of time-indexed points. Additionally, some methods may include determining a most likely sequence of states by identifying a lowest state cost metric at a final state at a terminal time-indexed point. A plurality of time-indexed points may be used so as to restrict the points from the time-dimensioned grid that are used, and may be determined with respect to a predetermined distance from a diagonal line through the K-dimensional space. The predetermined distance may be based on differences in the respective time durations of the observation sequences.

The method may include calculating a given state cost metric for a given state based on state cost metrics for all states associated with all candidate predecessor time-indexed points, the probability of transitioning from each state of each candidate predecessor time-indexed point to the given state, the respective probability of transitioning from the respective candidate predecessor time-indexed point and the joint probability of the observations being emitted from the state in the set of states. The determined sequence of states may also determine an alignment of the sets of observations.

Some embodiments described herein may take the form of an article of manufacture including a computer-readable medium, such as a solid state memory, compact disk, digital video disk ROM, magnetic storage medium and the like, having instructions stored thereon that, if executed by a computing device, cause the computing device to perform operations comprising: retrieving from memory a number K sets of time-sequential signal observations for each of a number K of signal repetitions, wherein each set of signal observations is associated with a respective dimension of a K-dimensional time grid having time-indexed points; retrieving from memory a set of parameters for each of a plurality of HMMs; calculating a state cost metric for each state in a set of states of a given HMM at each of a plurality of the time-indexed points, wherein for each state in the set of states and for a given time-indexed point, the state cost metric calculation provides a most-likely predecessor state and a corresponding most-likely predecessor time-indexed point; determining a cumulative probability measure for each of the plurality of HMMs; and, determining a most likely HMM from the plurality of HMMs.

In other embodiments, the apparatus comprises: a processor executing software applications stored in memory, the software instructions that include: calculating a state cost metric for each state in a set of states of a given HMM at each of a plurality of the time-indexed points, wherein for each state in the set of states and for a given time-indexed point, the state cost metric calculation provides a most-likely predecessor state and a corresponding most-likely predecessor time-indexed point; optionally determining a sequence of states using the calculated state cost metrics, determining a corresponding cumulative probability measure for each of the plurality of HMMs, and determining a most likely HMM from the plurality of HMMs.

In some embodiments, the apparatus further comprises a memory that stores: a digital representation of a plurality of sets of time-sequential signal observations for each of a number K of signal repetitions, wherein each set of signal observations is associated with a respective dimension of a k-dimensional time grid having time-indexed points, and a set of parameters for each of a plurality of HMMs.

In other embodiments, the apparatus further comprises an audio receiver that: receives a plurality of sets time-sequential audio signal observations for each of a number K of signal repetitions, wherein each set of audio signal observations is associated with a respective dimension of a k-dimensional time grid having time-indexed points, and converts the plurality of sets time-sequential audio signal observations for each of a number K of signal repetitions into a plurality of sets time-sequential analog electrical signal observations for each of a number K of signal repetitions.

In still other embodiments, the apparatus further comprises an analog-to-digital converter that transforms the plurality of sets time-sequential analog electrical signal observations for each of a number K of signal repetitions into the digital representation of a plurality of sets of time-sequential signal observations for each of a number K of signal repetitions.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
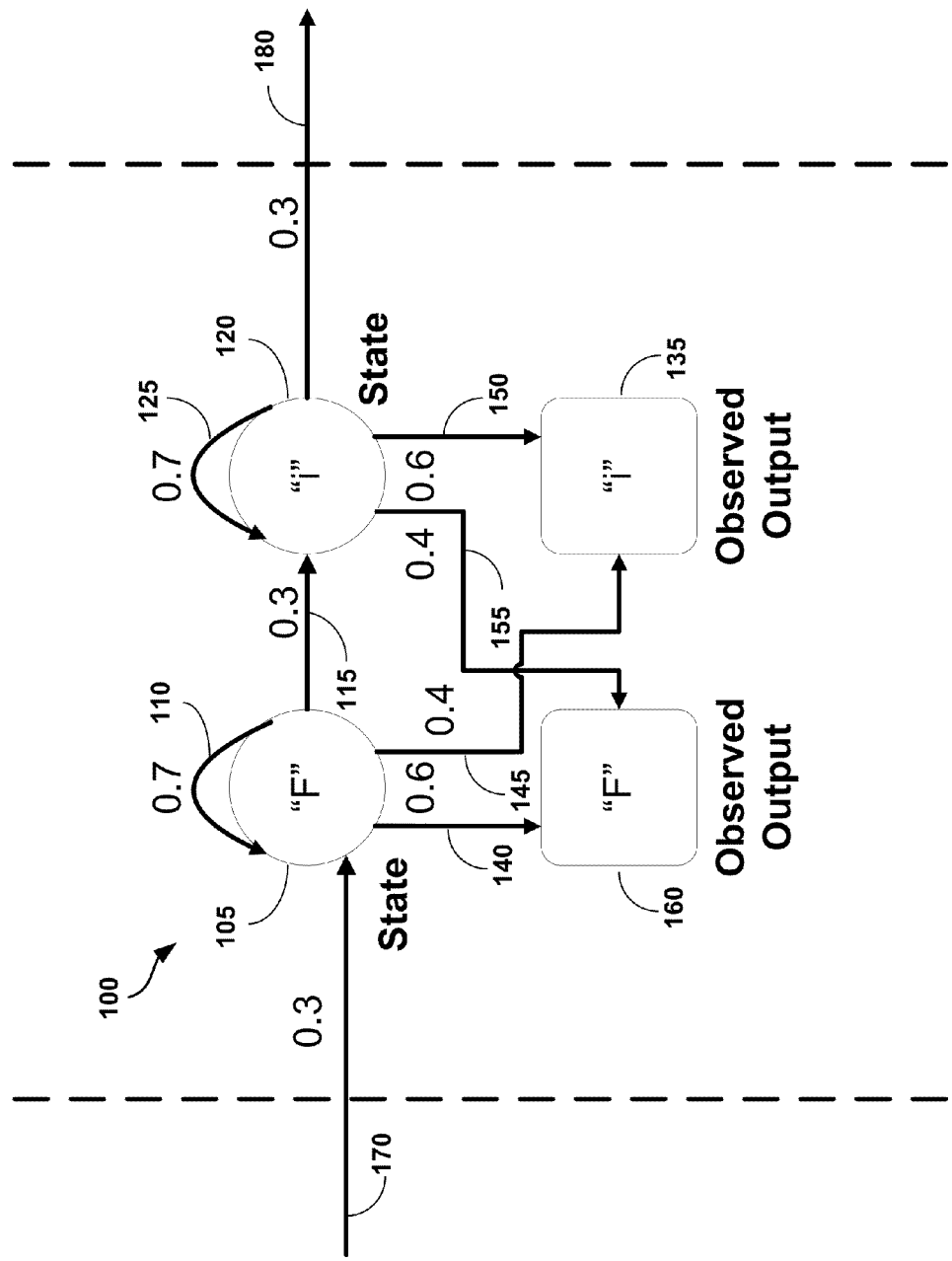
FIG. 1 is an example of a Hidden Markov Model for an example speech recognition system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Described herein are systems, devices, and methods for using Multi-Pattern Viterbi Algorithm for joint decoding of multiple patterns.

Generally, the embodiments described herein incorporate robust speech recognition techniques using Multi-Pattern Viterbi Algorithm (MPVA). Considering the analogy of human communication over telephones, a listener may ask a speaker to repeat certain portions of their speech, because the listener does not understand the speaker. Such situations occur more often in the presence of background noise where the intelligibility of speech is affected significantly. Under very high noise conditions or bursty error channels, such as in packet communication where packets may be dropped, a speech recognition system may benefit to take the approach of using repeated utterances in implementing speech recognition techniques. Although MPVA may be used in speech recognition and methods, the MPVA may also be used in any system or method that detects a signal from multiple patterns.

Further, embodiments may be used in a variety of applications including mobile telephone technologies, command and control applications, speech recognition in railway stations, military applications, robotics technologies, and pronunciation estimation as well as many non-speech applications. Many applications may have a need to accurately discern speech from a speaker that is in the presence of significantly adverse background noise. For example, speech recognition systems in mobile telephones do not work well in the presence of transient noises like car noise, road noise, etc. Embodiments may allow a mobile telephone user to repeat the name of the person the user would like to call and thereby increase speech recognition performance especially in the presence heavy/bursty noise. Further embodiments may be incorporated in command and control applications such as in a noisy cockpit where the pilot would like to give instructions. Likewise, embodiments may be used in noisy environments such as railway station where many people are speaking in the background (called babble noise).

In such military applications, soldiers may communicate with automated devices that incorporate speech recognitions systems. Consequently, speech recognition systems decode speech from soldiers on a battlefield where there is a high degree of ambient noise due to bullets from machine guns, shells from artillery, etc. Also, embodiments may be used in robotic industrial applications where a robot can use multiple repetitions of speech from a human controller to learn/recognize commands in a factory or other industrial environment. Further embodiments may be applicable in pronunciation estimation to jointly estimate pronunciations from multiple patterns. Embodiments may also be incorporated in widely used various applications like speech recognition, bioinformatics, telecommunications, linguistics, image processing, keyword spotting, etc. and any applications where dynamic programming (e.g. Viterbi algorithm) can be used.

A Hidden Markov Model (HMM) and dynamic programming may used in many speech recognition techniques. A HMM is a statistical model in which a system being modeled is assumed to be a Markov process with unobserved state. A Markov process is a mathematical model for a memoryless system, which the likelihood of a given future state, at any given moment, depends only on its present state, and not on any past states. In a regular Markov process, the state is directly visible to the observer, and therefore the state transition probabilities are the only parameters.

An example of a Markov process may be the sequence of results from flipping a coin. The result of flipping of a coin may be modeled as a random variable. There are two equally likely results for a random variable of flipping a coin, Heads and Tails, each with a probability equal to 0.5. The sum of the probabilities of all the outcomes of a random variable is 1. Further, a random process is a sequence of random variables, and hence, the sequence of results from flipping a coin can be modeled as a random process. In addition, the result of flipping a coin does not depend on the result of the previous coin flip and hence can be described as memoryless. Therefore, the sequence of results from flipping a coin can be modeled as a Markov process.

An example of a random process that is not memoryless may be the result of picking colored marbles from a bag without replacement. For example, a bag may contain five black marbles and five white marbles. The probability that a first pick from the bag is a black marble is 0.5. However, the probability of a second pick from the bag is a black marble depends on the result of the first pick. If the first pick was a black marble, then the probability of the second pick to be a black marble is 4/9=0.44. Conversely, if the first pick from the bag was a white marble, then the probability that the second pick is a black marble is 5/9=0.56. Thus, the probability of a certain result of picking a marble depends of past results. Therefore, such a random process is not memoryless.

Unlike a Markov process, in a Hidden Markov Model, the state is not directly visible, but instead an output event is observed that is dependent on the state. Each state has a transition probability to remain in the state or transition to another state. Further, each state has an emission probability for each output event. Therefore, the sequence of output events generated by a HMM gives some information about the sequence of states. The term "hidden" refers to the state sequence through which the model passes, not to the parameters of the model (such as the transition probabilities or the emission probabilities). Even if the model parameters are known exactly, the model is still "hidden" because the states are not visible to an observer. Hidden Markov models are especially known for their application in temporal pattern recognition such as speech, handwriting, gesture recognition, part-of-speech tagging, musical score following, partial discharges and bioinformatics.

FIG. 1 is an example of a Hidden Markov Model 100 for an example speech recognition system. The HMM 100 may model a speech utterance, for example, of a potential caller to an automatic call center for an airline. The example speech recognition system may be used in to discern a flight number in the caller's utterance. Further, the airline may have a spoken word "Five" as a digit in a flight number. Thus, the HMM used in the speech recognition system may include the phonemes of "Five" as states. A phoneme is the smallest segmental unit of sound employed to form meaningful contrasts between utterances. For example, "F," "i" "ve" are three different phonemes contained in the word "Five."

Hence, FIG. 1 shows a portion of an HMM that shows two states, "F" and "i," representing the first two phonemes in the word "Five" (105, 120). Further, the HMM has the observed outputs "F" and "i" (160, 135). The HMM 100 also shows the state transition probabilities transitioning from one state to the next (115, 170, 180) or remaining in a state (110, 115) as well as the emission probabilities from each state to an observed output (140, 145, 150, and 155). The emission probability is the likelihood of observing an event given the state of the HMM 100. The sum of all the transition probabilities into a state (110, 170, 115, 120) as well as the sum of the transition probabilities out of a state (110, 115, 125, 180) is equal to one. In addition, the sum of the emission probabilities into an observed output is also equal to one (140, 145, 150, 155). The HMM 100 in FIG. 1 may be only a portion of a larger HMM used by the speech recognition system. Thus, there may be a state transition from a state other than "i" to state "F" as indicated by transition 170 with a probability of 0.3. Further, there may be a state transition from "i" to a state other than "F" as indicated transition 180 with probability 0.3.

Often times, when implementing an application, a most likely sequence of states in a HMM may be helpful to find. Many different methods may be used in finding the most likely sequence of states in a HMM. Dynamic programming is both a mathematical optimization method that simplifies a complex problem by breaking it down into simpler subproblems in a recursive manner and may be used to find a most likely sequence of states in a HMM. Further, the Viterbi algorithm is an example dynamic programming algorithm for finding the most likely sequence of hidden states (called the Viterbi path) that results in a sequence of observed events in a Hidden Markov Model.

Embodiments described herein utilize a Multi-Pattern Viterbi Algorithm (MPVA), which is a novel dynamic programming method that may be used in many decoding and signal detection applications that may analyze multiple patterns. One such application is a speech recognition system. In the exemplary speech recognition system, the multiple utterances are jointly decoded to recognize the speech patterns. Persons of ordinary skill in the art would understand that the MPVA can also be used in any application that can use dynamic programming methods.

Figure 2:
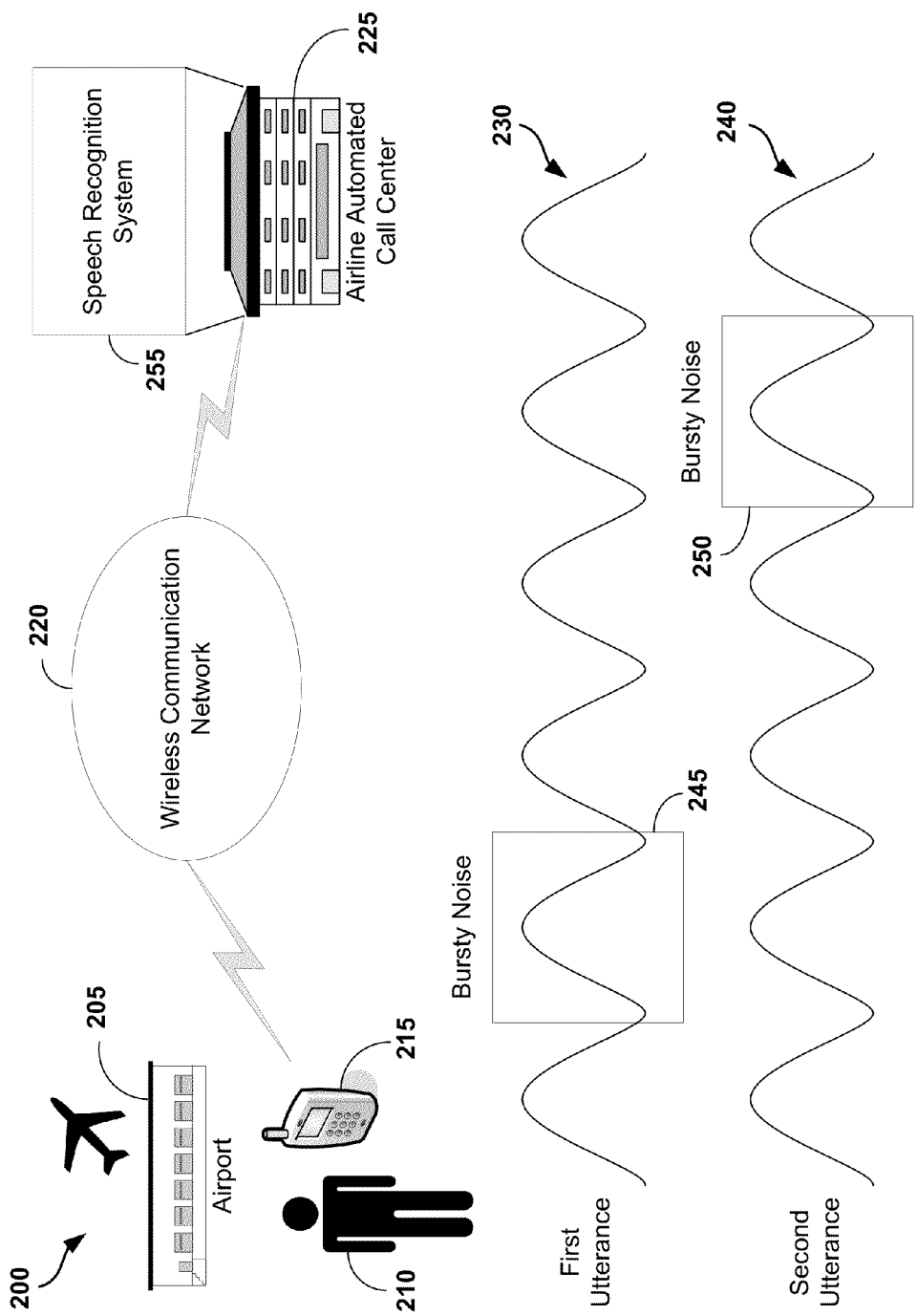
FIG. 2 shows an exemplary speech recognition application incorporating aspects of a Multi-Pattern Viterbi Algorithm.

FIG. 2 shows an exemplary speech recognition application 200 using MPVA. A caller 210 may contact and communicate with an airline automated call center 225 using a mobile telephone 215 across a wireless communication network 220. The automated call center may have a speech recognition system 255 that receives calls from airline customers such as caller 210. Further, the speech recognition system may request a flight number from the caller 210 to access flight information for the caller 210, for example. The caller 210 may then utter a digit of a flight number, such as "Five." The speech recognition system 255 may then request the caller 210 to repeat the utterance "Five." Each utterance of the digit of the flight number "Five" may be represented by an audio signal as shown in graphical representations (230, 240) in FIG. 2.

The benefits of the speech recognition system 255 having more than one utterance to decode the flight number given by the caller 210 are illustrated in the graphical representations of the two utterances (230, 240). Due to ambient noise from the airport surroundings 205 of the caller 210, bursty noise may affect different portions (245, 250) of the audio signal in each utterance (230, 240). Consequently, by processing the audio signal of a single utterance, the speech recognition system 255 may inaccurately decode the flight number uttered by the caller 210. However, by processing both utterances (230, 240), which contain the same sequence of phonemes (e.g. flight number), the speech recognition system 255 may receive two audio signals where bursty noise may have affected different parts of each signal (245, 250). Therefore, the speech recognition system may use the MPVA to accurately decode the speech uttered by the caller 210 using the two repeated utterances.

Speech recognition systems may use HMMs to assist in decoding speech from one or more received audio signals. Each received audio signal received by the speech recognition system may take one of many different forms. The processed signals may be analyzed as a time-sequence of observed outputs, or more simply observations, of the HMM used in the speech recognition system. One exemplary processing of an audio signal may be calculating the Mel-frequency Cepstral Coefficients (MFCCs) for the audio signal. In some embodiments, an MFCC vector may be calculated for every 20 milliseconds of sampled audio data. In some embodiments, the MFCCs may be calculated using overlapping intervals, such as by processing 20 milliseconds of audio data and then shifting by 10 milliseconds and processing the audio data in that interval, and so on. Cepstral coefficients may be found by processing the decibel spectrum of the audio signal, such as taking the Fourier Transform, for example. MFCCs may be one of many different features, or observations, for an audio signal in a speech recognition system. Features are the individual measurable heuristic properties of sound phenomena that may be observed outputs of the HMM in a speech recognition system. Features, or observations, can include MFCCS, spectral density, spectral energy, noise ratios, length of sounds, relative power, filter matches, etc., of portions of an audio signal.

Figure 3:
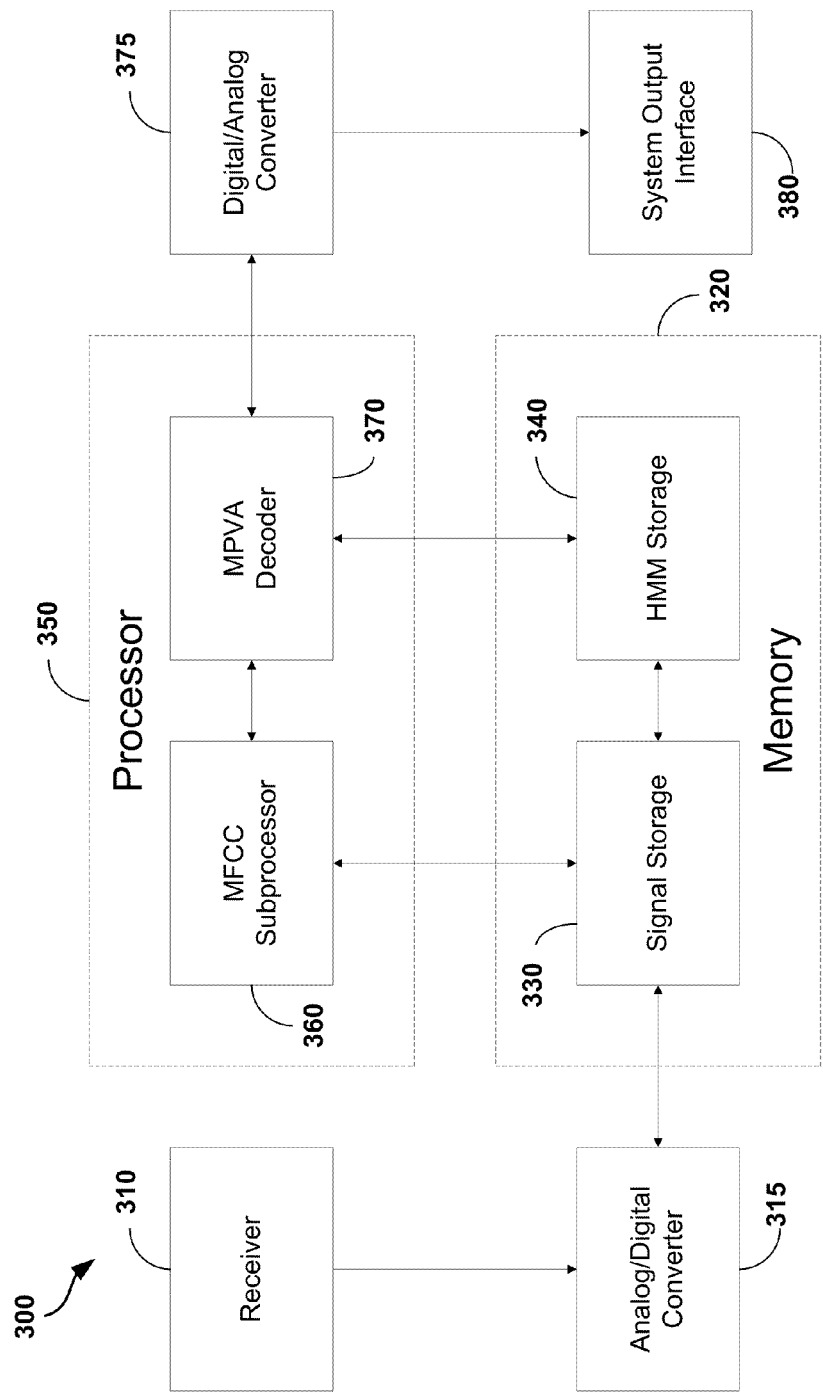
FIG. 3 is a functional block diagram of an example speech recognition system using a Multi-Pattern Viterbi Algorithm.

FIG. 3 is a functional block diagram of an example speech recognition system using a Multi Pattern Viterbi Algorithm decoder. The example speech recognition system 300 may be used in an airline automated call center. The automated call center may request a caller for a flight number to access requested information. Further, the automated call center may request the caller to repeat the flight number several times to ensure accurate recognition of the caller's speech.

When the caller makes an utterance of a flight number, such as "Five" or "Nine," then the speech recognition receives an audio signal that represents the caller's utterance by using a receiver 310. The receiver 310 may be a microphone, acoustic transducer, or some other audio receiver that converts an audio signal into an analog electrical signal. The receiver may forward the analog electrical signal to an analog-to-digital (ADC) converter 315 to transform the analog electrical signal into digital data that represents the analog electrical signal as well as the audio signal. The analog-to-digital converter 315 may store the digital data in a signal storage portion 330 of system memory 320. Of course, the sampled voice data may be provided by any number of means: the receiver and ADC may be provided by a handset and/or portions of a public switched telephone network, or by a microphone and ADC associated with a computer workstation, and as such are not necessary components of the system.

In addition, a processor 350 may be part of the example speech recognition system. The processor 350 may contain a MFCC subprocessor 360 that can access and process the stored digital data of the audio signal to obtain Mel-frequency Cepstral Coefficients (MFCCs) to be the feature vectors for the speech recognition system. The time sequence of feature vectors of a given utterance of a word or phrase will then form the time sequence of observations for the given utterance.

The processor may also include a MPVA decoder 370 that receives the observations in the form of MFCC feature vectors and accesses the HMM data from HMM storage portion 340 of the system memory 320. The HMM data includes well-known parameters generally denoted as $\lambda$.

The MPVA decoder 370 performs the MPVA to decode speech from the plurality of utterances retrieved from the memory device 320. In addition, the memory device 320 may store program instructions that may control the execution of the MPVA on the processor 350.

In some embodiments, the system may optionally include a digital-to-analog converter (DAC) 375. The DAC 375 transforms the digital data representing the decoded speech into an analog electrical signal. Further, the DAC forwards the analog electrical signal to a system output interface 380, which may be a speaker or some other acoustic transducer device that converts an analog electrical signal to an audio signal that represents the decoded speech. Hence, the speech recognition system 300 may recite the audio signal to the caller for the caller to verify the decoded speech. If the caller indicates that the decoded speech is not accurate, the speech recognition system may request the caller to articulate another repeated utterance such that the MPVA may have more data to accurately decode the caller's speech.

Figure 4:
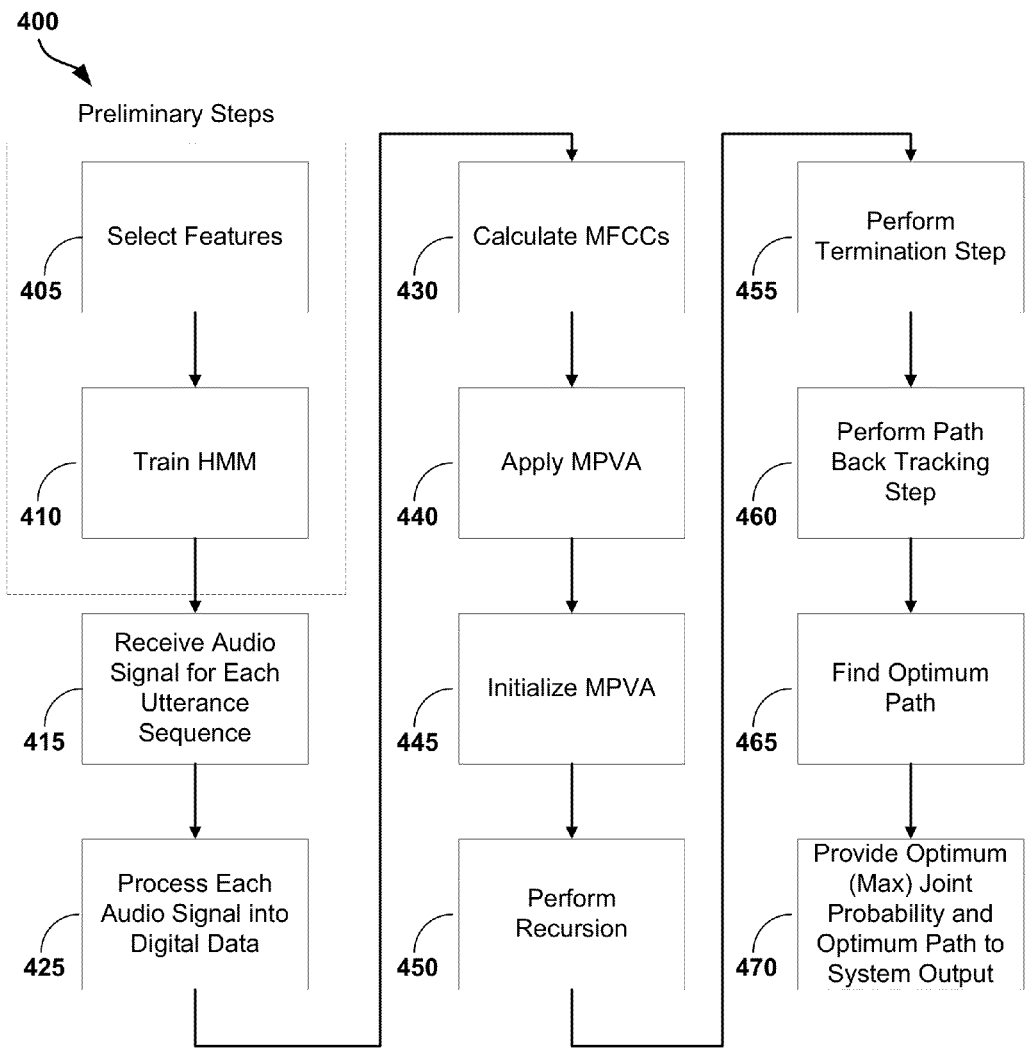
FIG. 4 is an example flowchart describing and example method of using a Multi-Pattern Viterbi Algorithm to decode speech from multiple speech utterances received by the speech recognition system.

FIG. 4 is an example flowchart 400 describing an example method of using a Multi-Pattern Viterbi Algorithm to decode speech from multiple speech utterances received by the speech recognition system. A preliminary step in decoding speech may be to select features of an audio signal to be used in a speech recognition 405. An example of a feature of a speech utterance may be Mel-frequency Cepstral Coefficients of the speech utterance. Another preliminary step may be to train one or more HMMs 410 that includes a number of states, state transition probabilities, and emission probability density function of observed outputs. A HMM may be developed from analyzing noise free speech. For example, a HMM may be trained to analyze a speech utterance "Voice Dialer" by several different speakers, male and female, with different accents (American, British, etc.) Such a speech utterance may include 8 states, each corresponding to a phoneme in the speech utterance, "V," "oi." "cc," "D," "i," "a," "l" "cr." During training of such an HMM, the state transition and emission probabilities for the speech utterance "Voice Dialer" may be found. In one embodiment, a plurality of HMMs are used in the system: there is a separate HMM for each pattern to be identified. In a voice recognition system, each of the HMMs correspond to a different word (or phrase). The HMMs may be derived by the system via training, or may be provided to the system.

The speech recognition system implementing the example method 400 may receive a plurality of audio signals that represent repeated speech utterances from a caller 415. The plurality of audio signals may be received by an audio receiver, microphone, acoustic transducer, or some other device. A further step in the example method 400 may be processing each audio signal into a digital data representation of each audio signal 425. Processing may include transforming each audio signal into an analog electrical signal by audio receiver, microphone, acoustic transducer, etc. Thereafter, each analog electrical signal may be converted to digital data using an analog-to-digital converter. The digital data may be stored in the memory of the speech recognition system. In other embodiments the digitized audio data samples are provided to the system and stored in memory. The analog-to-digital conversion, and the associated means and methods of obtaining the sampled audio data are known to persons skilled in the art and not significant.

In addition, the speech recognition system may calculate Mel-frequency Cepstral Coefficients (MFCCs) 430 based on the digital data representing each audio signal corresponding to an utterance. A processor or subprocessor may access the digital data from system memory to compute the MFCCs. The MFCCs are the time sequence of observations to be used by the MPVA. Further, the MPVA may use different features instead of MFCCs such as LPCCs, sound length, noise ratios, etc. LPCCs represent the spectral envelope of a digital signal of speech in compressed form, using the information of a linear predictive model.

In another step 440, the speech recognition applies the MPVA to the MFCCs using one or more HMMs stored in system memory. The MPVA may be implemented by a MPVA decoder embodied in a processor executing software instructions. When applying the MPVA, the speech recognition system receives K observation sequences denoted as $O_{1:T_1}^1, O_{1:T_2}^2, \ldots, O_{1:T_K}^K$ with frame lengths $T_1, T_2, \ldots, T_K$ respectively, where $O_{1:T_i}^i = (O_1^i, O_2^i, \ldots, O_{T_i}^i)$ and $O_{t_i}^i$ is the feature vector of the ith pattern at time frame ti. The set of feature vectors may be the computed MFCCs. Each of the K observation sequences may belong to the same pattern class (e.g. spoken word) and hence decoded by a single HMM denoted as λ. However, the speech recognition system may use one or more HMMs each corresponding to a word. Moreover, the K observation sequences may be different utterances of the same word by the same speaker. The MPVA is able to jointly decode these K patterns to discern the speaker's speech.

To visualize the joint decoding of multiple received utterances using the MPVA, consider an extension of a standard HMM trellis to K+1 dimensions, where K dimensions corresponds to the K patterns, and thus define a K-dimensional time grid, and one dimension corresponds to the set of HMM states for a given HMM. Similar to the two dimensional trellis of standard HMM, the trellis grid traversing is monotonic along all the K time axes, T1 to TK. This is because the observations of the repeated utterances progress jointly through time in a forward manner. One can see that if the repeated patterns (e.g., multiple utterances of the same word for a speech recognition algorithm) were exactly synchronized (e.g., with all of the phonemes occurring at the same relative time offsets), then one would expect the optimal path to be along the diagonal line through the K-dimensional time-indexed space. If, on the other hand, the utterances are not perfectly registered with each other, as one might expect, then the K observations for the corresponding portions of the pattern would not line up along the diagonal. Indeed, observations sequences are typically of different lengths for each pattern or utterance. Thus, as described below, the optimal path may not lie along the diagonal, and the algorithm accommodates different rates of use, or consumption, of the observations of each set of observations (because each set of observations is associated with one of the K time dimensions). The state transitions along the (K+1)th dimension are determined by the HMM state-transition matrix (either ergodic or left-to-right).

The HMM state sequence can be defined the following:

$$q \stackrel{def}{=} q_{\phi(1):\phi(T)} = [q_{\phi(1)}, \ldots q_{\phi(T)}] \quad (1)$$

where $q_{\phi(1)} \in 1:N$ is the state index at time $\phi(t) = (t1, \ldots, tK)$, where $\phi(t)$ is represented by a point in the K-dimensional grid, and N is the number of HMM states. Because the state sequence depends on the evolution of $\phi(t)$, another variable may be defined such as $\Phi = [\phi(1), \phi(2), \ldots, \phi(T)]$ on the K-dimensional time space or grid (See FIG. 5), such that $\phi(1) = (1, \ldots, 1), \phi(T) = (T1, \ldots, TK)$. $\Phi$ is the time alignment between the K patterns. Any point in the (K+1) dimensional trellis grid can be represented by $\{q\phi(t), \phi(t)\}$. Moreover, t represents the hop number along each coordinate in the K dimensional grid (See FIG. 5) and $\phi(t) = (t1, \ldots, tK)$ represents a single point in that K-dimensional space. Further, t moves from 1 to T, where T is the total number of hops needed to traverse from $(1, \ldots, 1)$ to $(T1, \ldots, TK)$. The value of T depends on the path traversed and its value for the optimum time path can be known only after path backtracking.

Three objectives for the MPVA may be to determine the total joint multi-pattern likelihood, the optimum state sequence, and the optimum time path, which are stated in Equations (2)-(6) below. The optimum state sequence reveals the decoded speech when the MPVA is used in a speech recognition system.

The total joint multi-pattern likelihood may be defined as:

$$P(O_{1:T_1}^1, \ldots, O_{1:T_K}^K; \lambda) = \Sigma_{\forall q} P(O_{1:T_1}^1, \ldots, O_{1:T_K}^K, q_{\phi(1):\phi(T)}; \lambda) \quad (2)$$

Considering all the valid paths through the (K+1)-dimensional grid, the joint K-pattern likelihood along the optimum HMM state sequence q* and optimum time path Φ* can be defined as follows:

$$P(O_{1:T_1}^1, \ldots, O_{1:T_K}^K, q^*, \Phi^*; \lambda) = \max_{\forall (q, \Phi)} P(O_{1:T_1}^1, \ldots, O_{1:T_K}^K, q, \Phi; \lambda) \quad (3)$$

Equation (2) is the total probability of all the K patterns with respect to the given HMM λ. Further, the maximum likelihood (optimum) HMM state sequence q* and optimum time path Φ* may be found as follows:

$$(q^*, \Phi^*) = \underset{(q,\Phi)}{\operatorname{argmax}} P(q, \Phi / O_{1:T_1}^1, \ldots, O_{1:T_K}^K; \lambda) \quad (4)$$

$$(q^*, \Phi^*) = \underset{(q,\Phi)}{\operatorname{argmax}} P(q, \Phi, O_{1:T_1}^1, \ldots, O_{1:T_K}^K; \lambda) \quad (5)$$

$$(q^*, \Phi^*) = \underset{(q,\Phi)}{\operatorname{argmax}} P(O_{1:T_1}^1, \ldots, O_{1:T_K}^K / q, \Phi; \lambda) P(q, \Phi; \lambda) \quad (6)$$

(Φ*, q*) is determined jointly by traversing through the (K+1)-dimensional grid. In the grid, the MPVA traversing from $\phi(1$ to $\phi(T)$ in the breadth first manner, covering all the time axes, in single steps. The recursive update for the partial path through the grid (similar to standard HMM Viterbi algorithm) can be calculated. The term $\delta\phi(t)(j)$ may be defined as:

$$\delta_{\phi(t)}(j) = \max_{\{q_{\phi(1)}, \ldots, q_{\phi(t-1)} = j, \phi(1), \ldots, \phi(t-1)\}} \quad (7)$$
$$P(O_{1:t_1}^1, \ldots, O_{1:t_K}^K, q_{\phi(1)}, \ldots, q_{\phi(t)} = j, \phi(1), \ldots, \phi(t); \lambda)$$

$\delta\phi(t)(j)$ is the accumulated likelihood while traversing through a multi-dimensional grid and can be described as the least cost metric from traversing from a state i to j and the time-indexed point $\phi(t-1)$ to $\phi(t)$. Traversing through the grid implies that portions of the K patterns are matched with respect to the HMM states. Thus, $\delta\phi(t)(j)$ may be considered a measure of the partial pattern likelihood or a cost metric. Each pattern is a sequence of MFCC vectors, of length T1 or T2 or ... Tk.

The application of the MPVA can be described as having several steps. These steps may include, but are not limited to, Initialization 445, Recursion 450, Termination 455, and Path Backtracking 460.

In an initialization step 445, the initial probability may $\delta_{\phi(1)}(i)$ may be denoted as:

$$\delta_{\phi(1)}(i) = P(O_1^1, \ldots, O_1^K, q_{\phi(1)}=i, \phi(1); \lambda) = \pi_i P(\phi(1)) b_i (O_1^1, \ldots, O_1^K) \quad (8)$$

where i=1, ..., N; $\pi_i = P(q\phi(i)=i)$ is the initial state distribution; $b_i(O_1^1, \ldots, O_1^K) = P(O_1^1, \ldots, O_1^K/q_{\phi(1)}=i, \lambda)$. Hence, $\delta_{\phi(1)}(i)$ is an initial value of equation (7) and may be considered a measure of likelihood at the starting point of the best path (e.g., $\{1,1,1,\ldots 1\}$) and the first set of observations from all the repeated utterances are used. The starting probability is assigned in each of the permitted HMM states and controlled by $\pi i$.

Also, $b_i(O_1^1, \ldots, O_1^K)$ is the probability density function of the HMM state i.

In a Recursion step 450, $\Delta\phi(t) = \phi(t) - \phi(t-1) = (\Delta t_1^1, \Delta t_2^2, \ldots, \Delta t_K^K)$, such that $0 \leq \Delta t_i^i \leq 1$ with at least one $\Delta t_i^i$ having a non-zero value. The location of the non-zero values in the vector provide an indication of which dimensions have been incremented, or traversed, in moving from $\phi(t-1)$ to $\phi(t)$. $\Delta\phi(t)$ may comprise at least one non-zero value and a maximum of K non-zero values. Another constraint that may be used in the MPVA may include limiting movement backwards in time. That is, certain possible predecessor time-indexed points $\phi(t-1)$ may be removed from consideration when populating the time-indexed K-dimensional grid with state cost metrics $\delta\phi(t)$ as described below. These constraints form the set of Local Continuity Constraints (LCCs) for traversing the multi-dimensional grid. For K patterns, for every $\phi(t)$, an exemplary LCC may be that there are (2K-1) possible $\phi(t-1)$s. Other types of LCCs can also be chosen.

Further, $S_{\phi(t)} = \{O_{t:}^i | \Delta t_i^i \neq 0, i=1,2, \ldots, K\}$ be the set of observations, such as MFCC vectors, that have been mapped together at $\phi(t)$. In addition, $\{O_{\phi(t)}\} = (O_{t_m}^m, \ldots, O_{t_n}^n)$ such that $(O_{t_m}^m, \ldots O_{t_n}^n)$ are all the feature vectors in the set $S_{\phi(t)}$. Moreover, $\{O_{\phi(t)}\}$ may be a subset of the vectors $(O_{t_1}^1, O_{t_2}^2, \ldots, O_{t_K}^K)$ retaining only those $O_{t_k}^k$ whose $\Delta t_k^k$ are non-zero. The set $S_{\phi(t)}$ and $\{O_{\phi(t)}\}$ can have a minimum of one feature vector and a maximum of K feature vectors. The $\Delta t^{kk}$ that are zero may indicate that the feature vector at the that time index $O_{t_k}^k$ is not emitted due to noise in the signal, time warping, etc. Thus, it can be shown that:

$$\delta_{\phi(t)}(j) = \max_{\{q_{\phi(t-1)}=i, \phi(t-1)\}} \{\delta_{\phi(t-1)}(i) a_{ij} P(\phi(t)/\phi(t-1)) b_j(\{O_{\phi(t)}\})\} \quad (9)$$

$\phi(t)$ varies from $\phi(1) = (1, \ldots, 1)$ to $\phi(T) = (T_1, \ldots, T_K); i,j = 1, 2, \ldots, N$. Moreover, $a_{ij}$ is the state transition probability from state i to state j (as in a standard HMM), $P(\phi(t)/\phi(t-1))$ is the probability of moving to $\phi(t)$ from $\phi(t-1)$ and $b_j(\{O_{\phi(t)}\})$ is the joint likelihood of $\{O_{\phi(t)}\}$ being emitted by state j. Further, $b_j(\{O_{\phi(t)}\})$ is the same as joint likelihood of all the vectors $\{O_{t_m}^m, \ldots O_{t_n}^n\}$ emitted by state j, where $\{O_{t_m}^m, \ldots O_{t_n}^n\}$ consist of all the feature vectors in a set $S_{\phi(t)}$. Thus, a HMM state-j can emit a variable number of vectors from the K patterns, corresponding to the number of non-zero values in the $\Delta\phi(t)$ vector. But, when the recursive computation of $\delta_{\phi(t)}$ reaches $\delta_{\phi(T)}$, each state j would have emitted the exact number of multi-pattern feature vectors=$(T_1+T_2+\ldots+T_K)$, irrespective of the which time path $\Phi$ it has taken.

In other words, one interpretation of portions of equation (9) is that at each of the time-indexed points $\phi(t)$ in the K-dimensional grid, the state cost metric for each state j in the HMM is determined. This is performed by looking at the cost metrics $\delta_{\phi(t-1)}(i)$ associated with each state i at each possible predecessor point $\phi(t-1)$, as well as the i-to-j state transition probabilities aij and the transition probabilities of moving from each candidate predecessor point $\phi(t-1)$ to $\phi(t)$. More specifically, one may calculate the state cost metrics for a given point in the grid by calculating a cost metric associated with each possible prior state at each possible predecessor time-indexed point and then selecting the lowest cost metric for each state. The state cost metric calculation provides a most-likely predecessor state, and also provides a corresponding most-likely predecessor time-indexed point.

Equation 9 describes a maximum probability, however, persons of ordinary skill in the art would understand that equation 9 would describe a cost metric by taking the negative of the logarithm of the argument of the equation 9, and replacing the "max" function with a "min" function.

The recursion step populates each point, or at least a subset of points, in a K-dimensional grid with the $\delta_{\phi(t)}(j)$ values. This populating is done by traversing the grid from left-to-right and bottom-to-top. For every point populated, the cost metric is incremented from a predecessor point to the current point by selecting the least cost option among the valid predecessor points; this choice of the "best predecessor" from among the various candidate predecessor points to each grid point may be stored in system memory for performing the Path Backtracking at a later time. Hence, the MPVA may not identify the optimum state sequence or optimum time path until the MPVA completes executing and reaches the end point of the grid, i.e., $\{T1, T2, \ldots Tk\}$ and then performs the path backtracking step.

Figure 5:
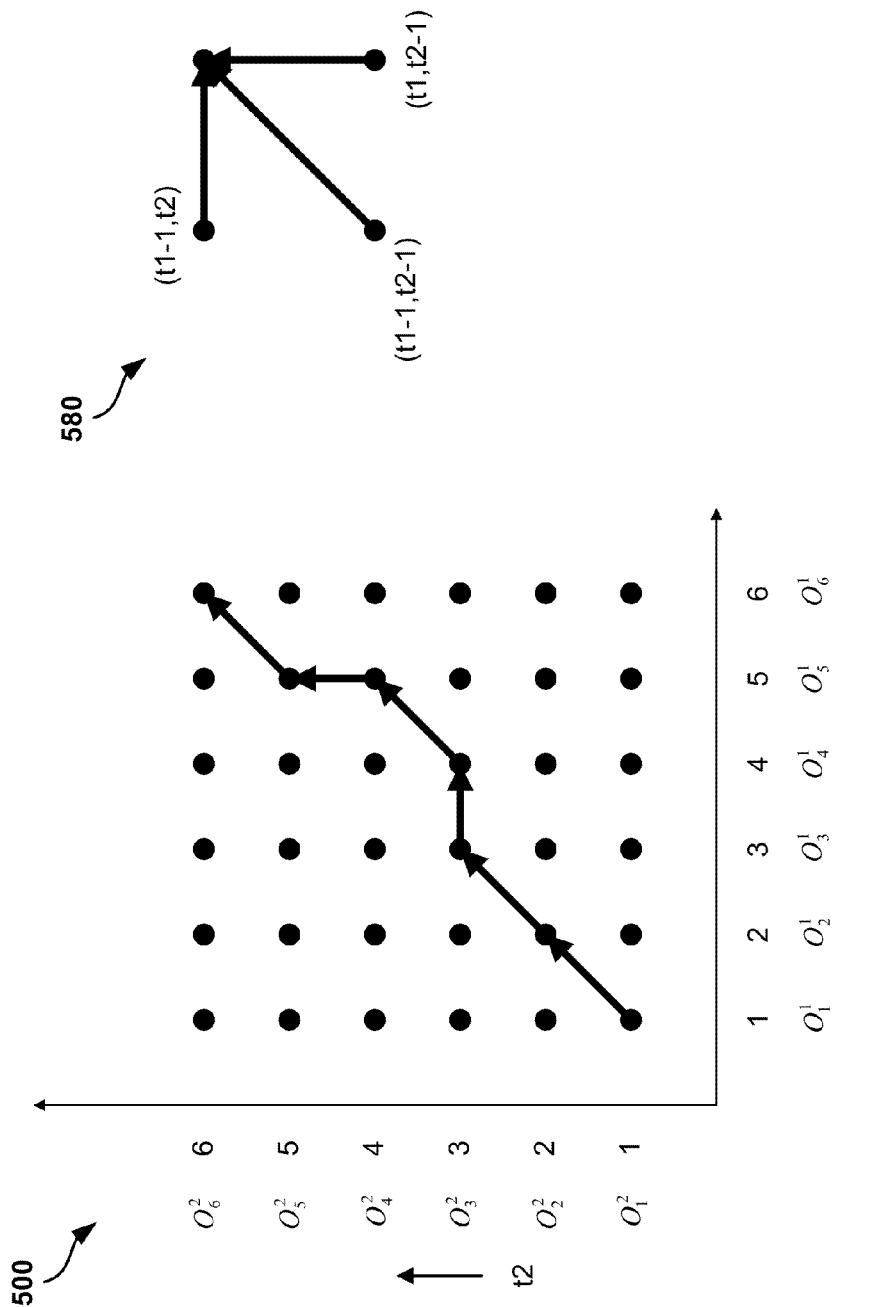
FIG. 5 is an example time path for decoding speech using K=2 patterns of speech in a Multi-Pattern Viterbi Algorithm.

FIG. 5 shows an example time path $\Phi$ that resulted from the decoding speech using K=2 patterns ($O_{1:T_1}^1$ (axis t1) and $O_{1:T_2}^2$ (axis t2) of speech in a Multi-Pattern Viterbi Algorithm 500. In FIG. 5, if coordinate (5,5) is considered to be $\phi(t)$, then $\phi(t-1)$ according to the path $\Phi$ is (5,4). There could be many such possible paths $\Phi$ and the MPVA may need to choose the optimum path $\Phi^*$ from them. At time instant (3, 3), feature vectors $O_3^1$ and $O_3^2$ are emitted by a state j. At time instant (4, 3), only vector $O_4^1$ is emitted as vector $O_3^2$ is already used. A variable number of vectors are emitted and there is no reuse of vectors. In one respect, the state cost metrics are based only on observations associated with dimensions that are incremented when moving from a given predecessor time-index point $\phi(t-1)$ to a given $\phi(t)$ time-indexed point.

FIG. 5 also shows the LCCs 580 that may be used when K=2. That is, for every point $\phi(t)=(t1,t2)$ in a 2-dimensional grid, there are 2K-1 predecessor points. Hence, when $\phi(t)=(t1, t2)$, then $\phi(t-1)$ could be (t1-1, t2), (t1, t2-1), or (t1-1, t2-1). As mentioned previously, certain candidate predecessor points may be removed from consideration to reduce the complexity of the calculations. Similarly, other restrictions or simplifications may be utilized, including global constraints, discussed below.

Further, the backtracking pointers for the state and time dimensions may be denoted as $\Psi\phi(t)(j)$ and $\Gamma\phi(t)(j)$ may be found by the following:

$$[\Psi_{\phi(t)}(j)\Gamma_{\phi(t)}(j)] = \underset{\{q_{\phi(t-1)}=i,\phi(t-1)\}}{\operatorname{argmax}} \{\delta_{\phi(t-1)}(i)a_{ij}P(\phi(t)/\phi(t-1))b_j(\{O_{\phi(t)}\}) \quad (10)$$

where $\phi(t)$ varies from $(1, \ldots, 1)$ to $(T_1, \ldots, T_K)$; $i, j=1, 2, \ldots, N$. In the calculation of $P(\phi(t)/\phi(t-1))$, $P(\phi(1))=1$ if $\phi(1)=(1, 1, \ldots, 1)$. Otherwise, $P(\phi(1))=0$.

There may be many possible ways of calculating $P(\phi(t)/\phi(t-1))$. The MPVA may have already defined the LCCs for reaching $\phi(t)$ from $\phi(t-1)$. Two possible methods are set forth below, and other ad hoc methods may be developed.

In one embodiment, assuming a uniform probability distribution for moving from one time instant to another, the following probability may be found:

$$P(\phi(t)/\phi(t-1)) = \frac{1}{L} \quad (11)$$

where L is the total number of possible positions of $\phi(t-1)$ from where $\phi(t)$ can be reached. The range of possible values for $\phi(t-1)$ may be defined by the LCC. Generally $L=2^K-1$ unless $\phi(t)$ lies on the borders of the multi-dimensional grid.

In another embodiment, the MPVA may give more weightage to the diagonal region of the LCC as in the following.

$$P(\phi(t)/\phi(t-1)) = \frac{\|\phi(t) - \phi(t-1)\|}{\sum_{\forall \phi(t-1)} \|\phi(t) - \phi(t-1)\|} \quad (12)$$

where $\|.\|$ stands for second norm. This implies that transitions involving a higher number of incremental movements are favored, such as transitions associated with diagonal movements. An example of another embodiment using an ad hoc rule may include a directional bias by giving more weight to transitions that tend to move the path back towards the center diagonal (the main diagonal from $(1,1, \ldots, 1)$ to $(T1, \ldots TK)$ through the K-dimensional space). Still further, the directional bias weighting might be proportional to the distance of the given $\phi(t)$ from the main diagonal, or might only be applied for given $\phi(t)$'s beyond a certain distance from the main diagonal.

In another embodiment, the MPVA may calculate $b_j(\{O_{\phi(t)}\})$ Even though the feature vectors $\{O_{t_1}^1 O_{t_2}^2, \ldots O_{t_K}^K\}$ may be from the same class, MPVA can assume that they are independent if it is given that they occur from the same state j, so as to compute the joint likelihood of the vectors being emitted from the HMM. Thus, the joint probability may be:

$$b_j(\{O_{\phi(t)}\}) = [b_j(O_{t_m}^m) \ldots b_j(O_{t_n}^n)]^{\frac{1}{r}} \quad (13)$$

where $(O_{t_m}^m, \ldots O_{t_n}^n)$ are all the feature vectors in the set $S_{\phi(t)}$ and $b_j(O_{t_i}^i)$ is the state j emission probability for the HMM (probability of vector $O_{t_i}^i$ emitted by state j given the HMM) and r is the cardinality of the set $S_{\phi(t)}$. A geometric mean using power of 1/r normalizes the use of r vectors emitted by a HMM state, comparable to a single vector likelihood. Such a normalization takes into account that not all feature vectors, or observations, at a time instant are emitted due to noise, time warp, etc. Therefore, MPVA can use aij's and πi's that are defined as in standard HMM. If $O_{t_i}^i$ is emitted from its actual state j from the correct HMM model λ, and the MPVA can expect that $b_j(O_{t_i}^i)$ to have a higher value than that if $O_{t_i}^i$, emitted from state j of the incorrect model. The multi-pattern joint likelihood given in equation (13) may enhance the contrast between the likelihoods with respect to the correct model and an incorrect model. Therefore, there is an improvement in speech recognition that increases accuracy when compared to individual decoding.

The MPVA performs a Termination Step 455 to stop the recursion. The recursion is terminated at a terminal point such as $\phi(t)=(T1, T2, \ldots, TK)$.

$$P^* = \max_{1 \leq i \leq N} \delta_{\phi(T)}(i) \quad (14)$$

$$q^*_{\phi(T)} = \operatorname*{argmax}_{1 \leq i \leq N} \delta_{\phi(T)}(i) \quad (15)$$

$$\phi(t=T)^* = (T_1, T_2, \ldots, T_K) = \phi(t=T) \quad (16)$$

Thereafter, the MPVA performs a Path Backtracking step 460.

$$\phi(t)^* = \Gamma_{\phi(t)^*}(q_{\phi(t+1)^*}) \quad (17)$$

$$q_{\phi(t)^*}^* = \Psi_{\phi(t+1)^*}(q_{\phi(t+1)^*}) \quad (18)$$

where $\phi(t)$ varies from $\phi(T)=(T_1, \ldots, T_K)$ to $\phi(1)=(1, \ldots, 1)$. The value of T for the optimum time path is not known until backtracking is complete. Thus, at step 465, the sequence of $q^*_{\phi(t)^*}$ and $\phi(t)^*$ for $1 \leq t \leq T$ gives the optimum decoded state sequence q* and the optimum decoded time path $\Phi^*$, respectively. The backtracking is performed via a simple look up procedure. For the terminal time-index point $(T_1, \ldots, T_K)$, the final state is determined to be the highest probability as determined by the cost function, such as the one set out in equation 9. It should be understood that the specific cost function may take many forms by using variations or approximations of the quantities set forth in equation 9, and/or by limiting which sets of values are considered such as by the local or global constraints described herein. From this determination, the predecessor state is known, as well as its corresponding predecessor time-index point. The processor then simply retrieves the data element for that prior state at that predecessor time-index point, and looks up the next prior state and next prior predecessor time-index point, and so forth until the point $(1,1, \ldots, 1)$ is reached.

Figure 6:
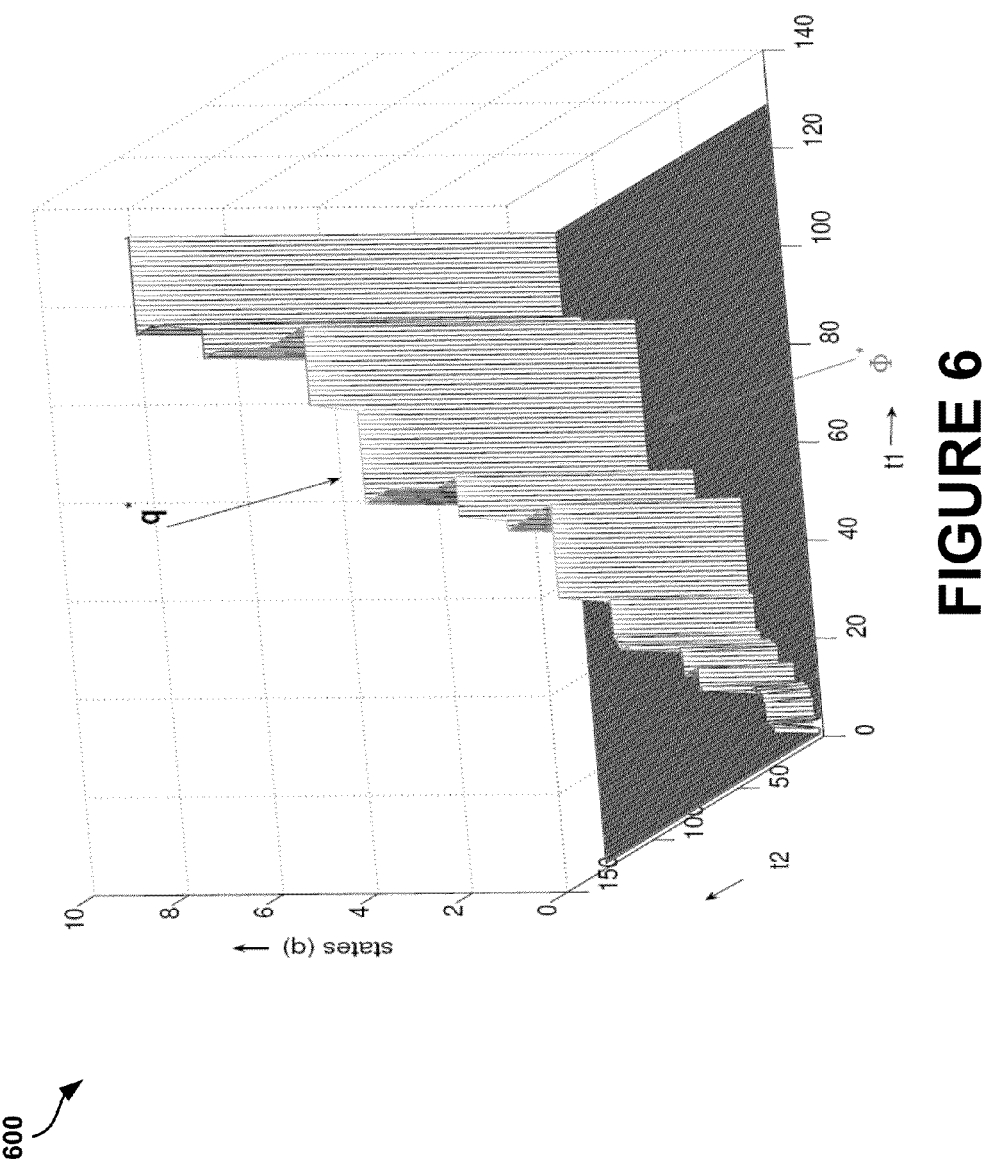
FIG. 6 is a three dimensional grid that shows the optimum state sequence and the optimum time path using K=2 patterns of speech in a Multi-Pattern Viterbi Algorithm.

Referring to FIG. 5, an example of optimum MPVA path 500 for the case of K=2 (of the word "Voice Dialer") and 9-state left-to-right HMM. The optimum time alignment $\Phi^*$ of the two patterns is shown. FIG. 6 is a three dimensional grid that shows the optimum state sequence and the optimum time path using K=2 patterns of speech in a Multi-Pattern Viterbi Algorithm. In particular, FIG. 6 shows the optimum HMM state sequence q* 600 along the z axis while the optimum time alignment $\Phi^*$ is shown on the x and y axis.

In addition, the MPVA may use Global Path Constraints (GPCs) to reduce the computational complexity of implementing MPVA significantly. The global path constraints may be used because it is anticipated that the optimal path will lie close to the diagonal, and not all time-indexed points need to be populated with state cost metrics. The diagonal path will be traversed if the observations are used (or consumed, or processed) generally at an equal rate. The delayed use of observations from one sequence relative to another sequence will result from a relative time warping of the observations of the repeated utterances, and is implied by the different lengths of the observation sequences. The maximum divergence from the diagonal through the K-dimensional time grid may be predetermined based on the difference of the time durations of the observation sequences, but other metrics may also be used to determine the global constraints. However, recognition performance may be difficult to evaluate because global constraints are imposed. Because of the robustness property achieved through joint decoding of equation (13), performance and thus, recognition accuracy can be expected to increase with increase in number of patterns K.

At a further step 470, a decoder, as part of a processor that implements MPVA, may provide the optimum (maximum) joint probability and optimum state sequence to a system output interface. The speech recognition system may be provided with digital data representing the optimum path or state sequence such that it transforms the digital data into an analog electrical signal using a digital-to-analog converter. Further, the system output interface may be a speaker or some other acoustic transducer device that transforms an analog electrical signal into an audio signal. The system output interface may provide the audio signal of the decoded speech to a caller to confirm the accuracy of the caller's speech utterances.

Figure 8:
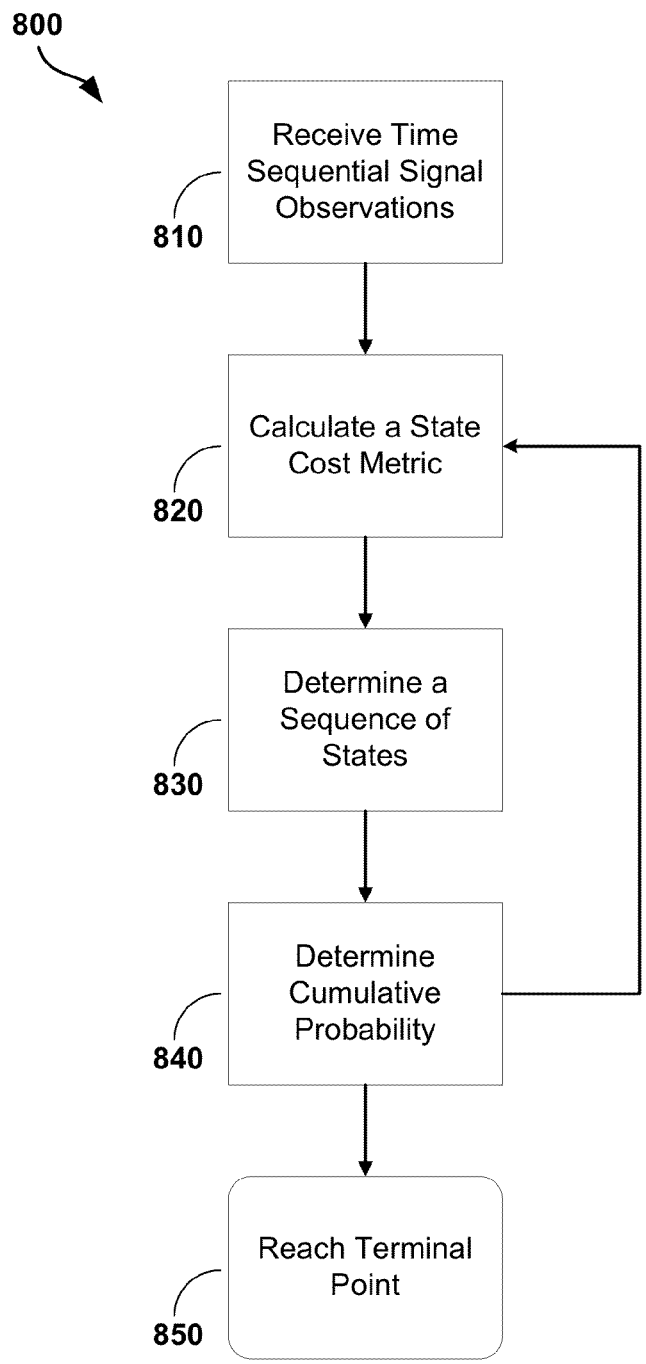
FIG. 8 is a flowchart for an example method 800 of detecting a signal from multiple signal observations using the Multi-Pattern Viterbi Algorithm.

FIG. 8 is a flowchart for an example method 800 of detecting a signal from multiple signal observations using a Multi-Pattern Viterbi Algorithm. At 810 in the example method may be receiving a plurality of sets of time-sequential signal observations for each of a number K of signal repetitions. Further, each set of signal observations is associated with a respective dimension of a K-dimensional time grid having time-indexed points. A further step 820 in the method may be that at each of a plurality of the time-indexed points, a state cost metric is calculated with a processor for each state in a set of states of a hidden Markov model (HMM). Moreover, for each state and each given time-indexed point, the state cost metric calculation provides a most-likely predecessor state and a corresponding most-likely predecessor time-indexed point. In addition, for a given time-indexed point, the state cost metric for each state is determined by calculating a cost metric associated with each possible prior state at each possible predecessor time-indexed point and selecting the lowest cost metric for each state. Further, for a given possible predecessor state, the state cost metrics are based only on observations associated with dimensions that are incremented when moving from the given predecessor time-index point to the given one of the plurality of time-indexed points.

An additional step in the method may be determining a sequence of states using the calculated state cost metrics 830 and determining a corresponding cumulative probability measure for the HMM 840. The method may repeatedly calculated the state cost metric for each state for the time-indexed points in a recursive fashion to determine a most likely sequence until it reaches a terminal point in the K-dimensional grid 850. The method may identify a most likely HMM based on the corresponding cumulative probability measures for the plurality of HMMs. Moreover, determining a most likely sequence of states includes identifying a lowest state cost metric at a final state at a terminal time-indexed point.

The signal observations used in the method are signal feature vectors and can be selected from the group consisting of Mel-Frequency Cepstral Coefficients feature vectors, Linear Predictive Coding Coefficients, spectral density, spectral energy, noise ratios, length of sounds, relative power, and filter matches. Each set of observations has a respective time duration, and the predetermined distance is based on differences in the respective time durations.

Further, determining the sequence of states using the calculated state cost metrics may include backtracking through the time-indexed points based on the state cost metrics. Moreover, calculating a given state cost metric for a given state is based on: (i) state cost metrics for all states associated with all candidate predecessor time-indexed points; (ii) the probability of transitioning from each state of each candidate predecessor time-indexed point to the given state; (iii) the respective probability of transitioning from the respective candidate predecessor time-indexed point; and (iv) the joint probability of the observations being emitted from the state in the set of states.

In addition, the determined sequence of states determines an alignment of the sets of observations. The plurality of time-indexed points is determined with respect to a predetermined distance from a diagonal line through the K-dimensional space.

Based on determining the performance of MPVA compared to other methods and/or algorithms, experiments A1, A2, A3 were conducted that include the basic Viterbi Algorithm (VA), for speaker independent Isolated Word Recognition (IWR) experiments, the results of which are presented in the disclosure. Experiment A1 was conducted, such that A1 uses K patterns and the best (maximum) likelihood of the K patterns is chosen. Given $O_{1:T_1}^{1}, O_{1:T_2}^{2}, \ldots, O_{1:T_K}^{K}$ as the individual patterns belonging to the same class, the joint likelihood score as $\theta j = \max 1 < i < K \, P(O_{1:T_i}^{i}; \lambda j)$ was obtained, where $\lambda j$ are the clean word models and the VA is used to calculate $P(O_{1:T_i}^{i}; \lambda j)$. A pattern $j^* = \arg \max j \, \theta j$ is selected. Moreover, the pattern which has the highest likelihood is chosen. Experiment A2 is the version of the Constrained Multi Pattern Viterbi Algorithm (CMPVA) (the particular version used in experiment A2 is called CMPVA-1) and experiment A3 uses MPVA. $P((t)/(t-1))$ is calculated using equation (11) and $bj(\{O(t)\})$ is calculated using equation (13). Further, Experiment A3 (GPC) was conducted using MPVA with Global Path Constraints (GPCs).

The experiments were conducted using the IISc-BPL database comprising 75 word vocabulary spoken by 36 female and 34 male adult speakers, with three repetitions for each word by the same speaker, digitized at a 8 kHz sampling rate. IISc-BPL database is an Indian accented English database used for Voice Dialer application. This database consists of English isolated words, English TIMIT sentences, Native language (different for different speakers) sentences, spoken by 36 female and 34 male adult speakers recorded in a laboratory environment using 5 different recording channels: PSTN-telephone (8 KHz sampling), Cordless local phone (16 KHz sampling), Direct microphone (16 KHz sampling), Ericsson (GSM) mobile phone (8 KHz sampling), Reverberant room telephone (Sony) (8 KHz sampling).

The vocabulary consists of a good number of phonetically confusing words used in the Voice Dialer application. Left-to-right HMMs are trained for clean speech using the Segmental K Means (SKM) algorithm. 25 male and 25 female speakers are used for training, with three repetitions of each word by each speaker. The MPVA was tested for 20 unseen speakers (11 female and 9 male) in both clean and noisy cases. Test words are three patterns for each word by each speaker, at each signal to noise ratio (SNR). The experiments were run for speech affected by burst noise. Burst noise was added to 10% of the frames of each word (in time domain) at −5 dB, 0 dB, 5 dB SNRs (local) to all the three patterns. (The remaining frames are clean; the range of −5 dB to +5 dB indicates severe to mild degradation of the noise affected frames.) The burst noise occurred randomly anywhere in the spoken word with uniform probability distribution. MFCCs, Δ MFCC, and Δ2 MFCC were used without their energy components (36 dimensions). Energy components are neglected and Cepstral Mean Subtraction was done. A variable number of states are used for each word model; i.e. proportional to the average duration of the training patterns, for each second of speech, 8 HMM states were assigned, with 3 Gaussian mixtures per state. Experiments were also conducted out on other kinds of transient noises like machine gun noise and babble noise, which were taken from the NOISEX 92 database at various SNR.

The results of the experiments are summarized in Table 1. Comparison of ASR percentage accuracy for clean and noisy speech for experiments VA, A1, A2, and A3, for K=2 patterns. bj ({O (t)}) is calculated using equation (13). P((t)/(t−1)) is calculated using equation (11). Burst noise was added to 10% of frames at varying SNR. Babble noise and machine gun noise were added to the entire speech pattern. The column headings for Table 1 are as follows: VA Viterbi Algorithm; Experiment A1—best of two patterns using VA; Experiment A2—MPDTW+CMPVA-1; Experiment A3—MPVA; Experiment A3 (GPC)—MPVA with Global Path Constraints.

The results of experiment A3 using MPVA with K=2 test patterns, gives an improvement of 2.3% ASR accuracy over the VA. Interestingly, the experiment A1 provides a mild improvement of ≈0.2% and 3% for clean and noisy speech (at −5 dB SNR 10% burst noise) respectively, over the VA benchmark. This shows that use of multiple patterns is indeed beneficial, but just maximization of likelihoods is weak. Experiment A3 is also significantly better than experiment A1, which considers only the better of the two patterns for recognition. However for clean speech there is not much difference in ASR accuracy between experiments A2 and A3.

Now consider the case of speech with burst noise. Table 1 shows that at −5 dB SNR, 10% burst noise speech, the word error rate using the proposed MPVA decreased by 28.5% when compared to using a single pattern VA. Further, Table 1 shows that there is a very high decrease of 19.9% in word error rate using the MPVA (experiment A3) when compared to using the earlier proposed CMPVA-1 (experiment A2). Using the McNemar's test for statistical significance difference, we found that the difference in results between experiments A2 and A3 (also experiments VA and A3) for the burst noise cases are extremely statistically significant.

Similarly, Table 1 shows an improvement in ASR accuracy for other noisy speech like babble noise and machine gun noise at 5 dB or 10 dB SNR for experiment MPVA compared to VA. However, there was no significant difference in the performance of experiments A2 and A3 when babble and machine gun noise was used.

Variations of the experiments were conducted when 100% of all the test speech patterns are affected by additive white Gaussian noise (AWGN) at 5 dB SNR. The VA gave a percentage accuracy of 22.89%. Experiment A3 gave an accuracy of 21.73% which is close to the VA accuracy, although slightly worse. However, when AWGN was added at −5 dB SNR, VA gave an accuracy of 3.73%, the accuracy of experiment 3 improved to 4.09%. Therefore, for stationary noises like AWGN, MPVA provides similar performance to that of VA. This is better than CMPVA-1 which gave much poorer performance than VA when speech is affected by AWGN [5].

We also see from Table I that the use of GPCs (experiment A3 (GPC)) does not alter the performance of the MPVA significantly. Since the use of GPCs reduces the computational complexity by more than 50%, the experiments provide justification to use GPCs.

TABLE 1

| | VA | A1 | A2 | A3 | A3 (GPC) |
|---|---|---|---|---|---|
| Clean | 89.70 | 89.8 | 91.7 | 92.00 | 91.98 |
| −5 dB, 10% burst | 57.13 | 60.3 | 61.7 | 69.33 | 67.76 |
| 0 dB, 10% burst | 61.49 | 64.2 | 66.1 | 72.42 | 71.53 |
| 5 dB, 10% burst | 67.38 | 69.4 | 72.4 | 75.93 | 75.80 |
| 5 dB babble | 44.27 | 44.3 | 49.8 | 49.07 | 49.02 |
| 10 dB babble | 59.73 | 60.7 | 65.5 | 64.93 | 64.87 |
| 5 dB machine gun | 66.71 | 68.0 | 74.5 | 74.28 | 74.36 |
| 10 dB machine | 71.47 | 72.4 | 78.4 | 77.82 | 77.96 |

The computational complexity of the different algorithms used in the experiments A1, A2, and A3, are considered. The complexity of Viterbi Algorithm may include calculating bj(Ot) (which is a Gaussian mixture which has exponential terms) as one Es unit and the HMM has N states. A unit called MACs (Multiply-Accumulate) is defined. One MAC is a combination of one addition and one multiplication operation. Also for simplicity, one maximum (max) operation is assumed to be equal to one addition operation. At each node in the trellis, there is {N−1 max operations, N+1 multiplications, and 1 Es unit}≈{N MACs, 1 Es}. The total complexity of the Viterbi Algorithm is {T.N2 MACs, T.N Es}, where T is the number of frames in the pattern.

The complexity of MPVA may include calculating the joint probability bj({O (t)}) be X Es units. P((t)/(t−1)) of equation (11) has one multiplication operation. At each node in the trellis (equation (9)), there are {N−1 max operations, 2N+1 multiplications, X Es}. For simplicity, assume T1=T2= . . . , =TK =T. The total complexity of the MPVA is {TK.N2 MACs, TK. N2 multiplications, TK.N.X Es}.

Embodiments describe methods for determining a single optimum state sequence for a K set of patterns jointly using a Multi-Pattern Viterbi Algorithm (MPVA). The method includes selecting the local continuity constraints (LCC), if any, in determining the optimum time path through the (K+1) dimensional grid. Based on the MPVA, the ASR accuracy is significantly improved over that of single pattern VA. The MPVA technique also outperforms the CMPVA technique in the presence of noise. The MPVA formulation has the generality of being applicable to many other problems, where robustness of HMM based pattern matching is required. Similar to the extension of VA to jointly recognize multiple patterns, it is possible to extend the Forward and Backward algorithm to jointly recognize multiple patterns.

Figure 7:
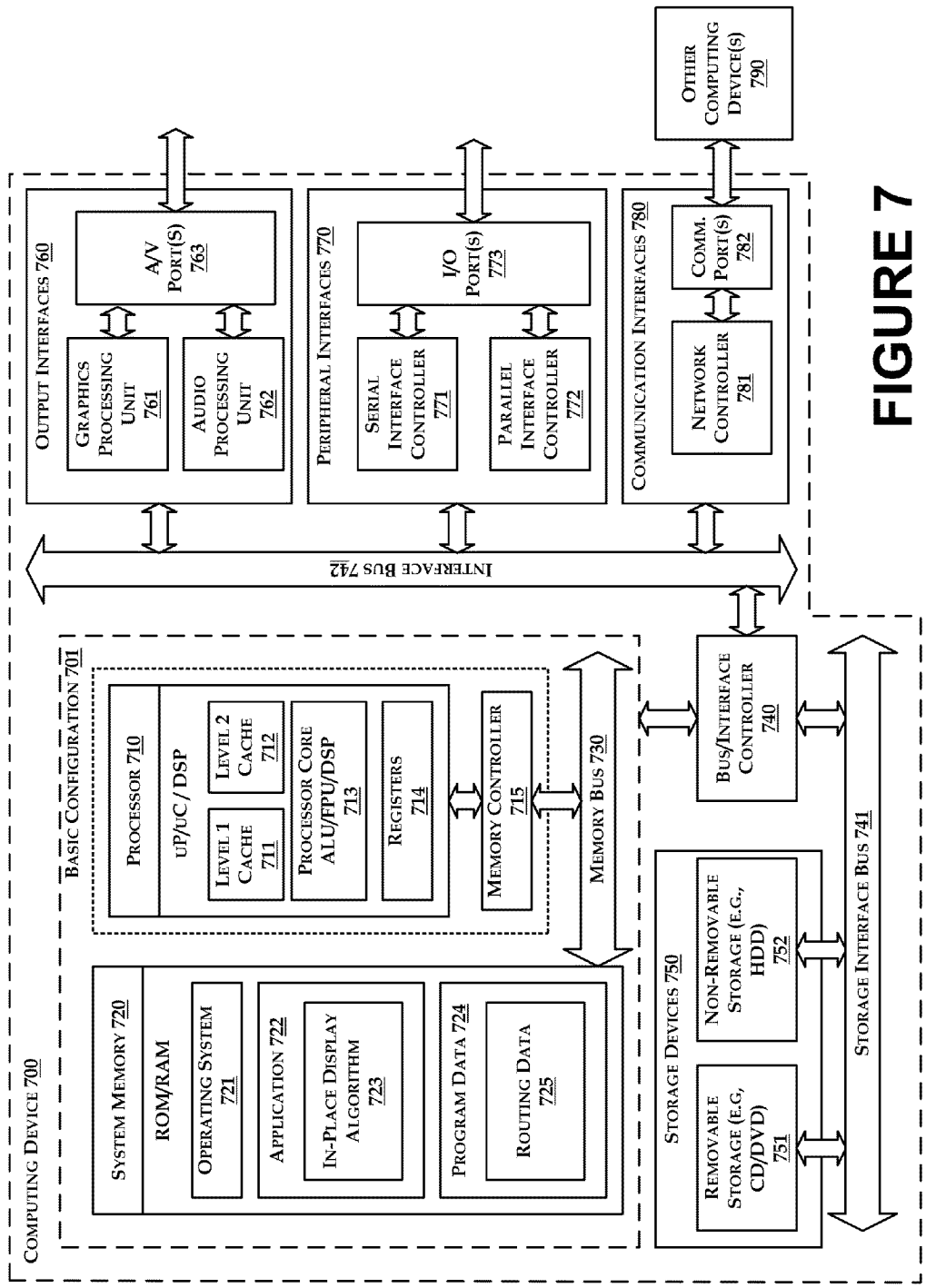
FIG. 7 is a block diagram illustrating an example computing device 700 that is arranged for a speech recognition system using a Multi-Pattern Viterbi Algorithm.

FIG. 7 is a block diagram illustrating an example computing device 700 that is arranged for a pattern recognition system using a MPVA. In a very basic configuration 701, computing device 700 typically includes one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof System memory 720 typically includes an operating system 721, one or more applications 722, and program data 724. Application 722 includes control input processing algorithm 723 that is arranged to provide inputs to the electronic circuits, in accordance with the present disclosure. Program Data 724 includes control input data 725 that is useful for minimizing power consumption of the circuits, as will be further described below. In some example embodiments, application 722 can be arranged to operate with program data 724 on an operating system 721 such that power consumption by an electronic circuit is minimized. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Exemplary computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Exemplary output interfaces 760 include a graphics processing unit 761 and an audio processing unit 762, which can be configured to communicate to various external devices such as a display or speakers via one or more A/V ports 763. Exemplary peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An exemplary communication interface 780 includes a network controller 781, which can be arranged to facilitate communications with one or more other computing devices 790 over a network communication via one or more communication ports 782. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving a set of signal observations for a signal repetition, wherein the set of signal observations is associated with a dimension of a K-dimensional time grid having a plurality of time-indexed points;
   calculating a state cost metric for a state in a plurality of states of a statistical model, for a given time-indexed point, wherein the state cost metric calculation provides a most-likely predecessor state and a corresponding most-likely predecessor time-indexed point;
   determining a sequence of states using the state cost metric calculation;
   determining a corresponding cumulative probability measure for the statistical model;
   calculating a cost metric associated with a possible prior state at a possible predecessor time-indexed point;
   selecting a lowest cost metric for the state to determine the state cost metric;
   observing dimensions that are incremented when moving from a given predecessor time-index point to a given one of the plurality of time-indexed points; and
   basing the state cost metric on at least the observing.

2. The method of claim 1, further comprising:
   repeating the calculating the state cost metric for the state for the plurality of time-indexed points and determining a most likely sequence and corresponding cumulative probability measure for a plurality of statistical models; and
   identifying a most likely statistical model based on the corresponding cumulative probability measures for the plurality of statistical models.

3. The method of claim 1, wherein the determining the sequence of states comprises identifying a lowest state cost metric at a final state at a terminal time-indexed point.

4. A method, comprising:
   receiving a set of signal observations for a signal repetition, wherein the set of signal observations is associated with a dimension of a K-dimensional time grid having a plurality of time-indexed points;
   calculating a state cost metric for a state in a plurality of states of a statistical model, for a given time-indexed point, wherein the state cost metric calculation provides a most-likely predecessor state and a corresponding most-likely predecessor time-indexed point;
   determining a sequence of states using the state cost metric calculation; and
   determining a corresponding cumulative probability measure for the statistical model;
      wherein the set of signal observations includes feature vectors, and
      wherein the feature vectors are selected from at least one of: Mel-Frequency Cepstral Coefficients feature vectors, Linear Predictive Coding Coefficients, spectral density, spectral energy, noise ratios, length of sounds, relative power, and filter matches.

5. A method, comprising:
receiving a set of signal observations for a signal repetition, wherein the set of signal observations is associated with a dimension of a K-dimensional time grid having a plurality of time-indexed points, wherein the plurality of time-indexed points are determined with respect to a predetermined distance from a diagonal line through the K-dimensional time grid;
calculating a state cost metric for a state in a plurality of states of a statistical model, for a given time-indexed point, wherein the state cost metric calculation provides a most-likely predecessor state and a corresponding most-likely predecessor time-indexed point;
determining a sequence of states using the state cost metric calculation; and
determining a corresponding cumulative probability measure for the statistical model.

6. The method of claim 5, wherein the set of observations has a first time duration, and the predetermined distance is based on a difference of the first time duration and a second time duration of another set of signal observations.

7. The method of claim 1, wherein the determining the sequence of states comprises backtracking through the plurality of time-indexed points based on the state cost metric.

8. A method, comprising:
receiving a set of signal observations for a signal repetition, wherein the set of signal observations is associated with a dimension of a K-dimensional time grid having a plurality of time-indexed points;
calculating a state cost metric for a state in a plurality of states of a statistical model, for a given time-indexed point, wherein the state cost metric calculation provides a most-likely predecessor state and a corresponding most-likely predecessor time-indexed point, wherein the calculating is based on:
state cost metrics for states associated with candidate predecessor time-indexed points,
a probability of transitioning from each state of each candidate predecessor time-indexed point to the given state,
a respective probability of transitioning from the respective candidate predecessor time-indexed point, and
a joint probability of the observations being emitted from the state in the plurality of states;
determining a sequence of states using the state cost metric calculation; and
determining a corresponding cumulative probability measure for the statistical model.

9. The method of claim 1, wherein the determined sequence of states determines an alignment of the set of signal observations.

10. An article of manufacture including a non-transitory computer-readable medium having instructions stored thereon that, when executed by a computing device, cause the computing device to perform operations comprising:
retrieving from memory a set of signal observations for a signal repetition, wherein the set of signal observations is associated with a dimension of a K-dimensional time grid having a plurality of time-indexed points, wherein the plurality of time-indexed points are determined with respect to a predetermined distance from a diagonal line through the K-dimensional time grid;
retrieving from memory a set of parameters for a plurality of statistical models;
calculating a state cost metric for a state in a plurality of states of a statistical model at a time-indexed point, wherein the state cost metric calculation provides a most-likely predecessor state and a corresponding most-likely predecessor time-indexed point;
determining a cumulative probability measure for the statistical model; and
determining a most likely statistical model from the plurality of statistical models.

11. An apparatus, comprising:
a processor configured to execute software applications stored in memory, the software instructions including:
calculating a state cost metric for a state of a statistical model at a time-indexed point, wherein the state cost metric calculation provides a most-likely predecessor state and a corresponding most-likely predecessor time-indexed point;
determining a sequence of states using the state cost metric calculation;
determining a corresponding cumulative probability measure for the statistical model;
calculating a cost metric associated with a possible prior state at a possible predecessor time-indexed point;
selecting a lowest cost metric for the state to determine the state cost metric;
observing dimensions that are incremented when moving from a given predecessor time-index point to a given one of the plurality of time-indexed points; and
basing the state cost metric on at least the observing.

12. The apparatus of claim 11, further comprising a memory configured to:
store a digital representation of a set of time-sequential signal observations for a signal repetition, wherein the set of time-sequential signal observations is associated with a dimension of a k-dimensional time grid having a plurality of time-indexed points; and
store a set of parameters for a plurality of statistical models.

13. The apparatus of claim 11, further comprising an audio receiver configured to:
receive a set of audio signal observations for a signal repetition, wherein the set of audio signal observations is associated with a dimension of a k-dimensional time grid having a plurality of time-indexed points; and
convert the set of audio signal observations into a set of analog electrical signal observations for a signal repetition.

14. The apparatus of claim 11, further comprising an analog-to-digital converter configured to convert a set of analog electrical signal observations into a set of digital electrical signal observations.

15. The apparatus of claim 11, wherein the processor is further configured to compute a set of features vectors based on a digital representation of a set of signal observations for a signal repetition.

16. The apparatus of claim 11, wherein the processor is further configured to transform the sequence of states using the state cost metric calculation into a digital representation of the sequence of states.

17. The apparatus of claim 16, further comprising a digital-to-analog converter configured to transform the digital representation of the sequence of states into an output analog electrical signal.

18. The apparatus of claim 17, further comprising a system output interface configured to transform the output analog electrical signal into an output audio signal.

* * * * *

UNITED STATES PATENT AND TRADEMARK OFFICE
CERTIFICATE OF CORRECTION

| | | |
|---|---|---|
| PATENT NO. | : 8,630,971 B2 | Page 1 of 1 |
| APPLICATION NO. | : 12/652608 | |
| DATED | : January 14, 2014 | |
| INVENTOR(S) | : Nair et al. | |

It is certified that error appears in the above-identified patent and that said Letters Patent is hereby corrected as shown below:

In the Specification

Column 8, Line 47, delete ""cc,"" and insert -- "ce," --, therefor.

Column 8, Line 47, delete ""cr."" and insert -- "er." --, therefor.

Column 9, Line 38, delete "K patterns to discern the speaker's speech." and insert the same at Line 36, after "these," -- as a continuation of paragraph.

Column 10, Line 57, delete " $\phi(1 to$" and insert -- $\phi(1)$ to --, therefor.

Column 18, Line 56, delete "thereof" and insert -- thereof. --, therefor.

Column 18, Line 62, delete "thereof" and insert -- thereof. --, therefor.

Column 19, Line 1, delete "thereof" and insert -- thereof. --, therefor.

Column 19, Line 23, delete "thereof" and insert -- thereof. --, therefor.

Signed and Sealed this
Fifteenth Day of July, 2014

Michelle K. Lee
*Deputy Director of the United States Patent and Trademark Office*